United States Patent [19]

Haynes

[11] 4,302,193

[45] Nov. 24, 1981

[54] READING TUTOR TIMER

[76] Inventor: Leonard S. Haynes, 1715 Glastonberry Rd., Rockville, Md. 20854

[21] Appl. No.: 112,844

[22] Filed: Jan. 17, 1980

[51] Int. Cl.$^3$ .................. G09B 5/06; G09B 17/00
[52] U.S. Cl. .................................. 434/178; 434/308
[58] Field of Search .............. 35/8 A, 35 C; 360/74.1, 360/74.4; 434/178, 308

[56] References Cited

U.S. PATENT DOCUMENTS

| | | | |
|---|---|---|---|
| 3,222,597 | 12/1965 | Beatenbough et al. ............. | 35/8 A |
| 3,245,156 | 4/1966 | De Bloois et al. ................... | 35/8 A |
| 3,540,132 | 11/1970 | Glass et al. ........................... | 35/8 A |
| 3,738,021 | 6/1973 | Hino et al. ............................ | 35/8 A |
| 3,996,671 | 12/1976 | Foster .................................. | 35/8 A |
| 4,035,929 | 7/1977 | Groff ................................... | 35/8 A |

Primary Examiner—William H. Grieb
Attorney, Agent, or Firm—Stephen F. K. Yee

[57] ABSTRACT

An audio-visual educational aid which coordinates reading of textual material with an audio presentation of the material. An audio reproduction of the material is made on a recording medium together with audio player control signals. A student reader "reads along" with the audio reproduction, and is provided with a control button which he is to depress upon reaching the end of a predefined portion of textual material, such as the end of a line. If the button is not depressed within a pre-determined time, circuitry within the educational aid stops the audio player and prevents it from resuming until a restart button is depressed, and a punitive time delay has lapsed. The length of the time delay is increased with each stoppage of the player. Various additional features are incorporated into the educational aid to provide reinforcement to the reader.

11 Claims, 3 Drawing Figures

READING TUTOR TIMER

BACKGROUND OF THE INVENTION

1. Field of the Invention

This invention relates generally to educational aids, and is more particularly directed to an educational aid of the "talking book" type having a reader interaction mechanism which encourages and reinforces reader attentivenes.

2. Description of the Prior Art

It has long been recognized that the acquisition of good reading skills may be accelerated through the use of techniques which operate and communicate with more than one of the perceptual senses of the learner. For example, the learning process is accelerated through the use of teaching aids which are both audio and visual in nature. For beginning readers, for instance, it is extremely helpful to couple the written text with its audio equivalent. Frequently, this technique also motivates the slow reader who finds reading difficult, laborious, and demoralizing due to difficulties encountered.

Various teaching aids of the "talking book" type have been proposed in which a record, tape or other audio reproduction of a selected material, such as a book, is coordinated with the printed text. A class of talking book teaching aids of the prior art include apparatuses in which the audio reproduction medium also includes signals which control the operation of the audio reproduction device. These signals may stop the device at the end of a page or pages of printed materials, at points within a programmed lesson in which a response or other interaction is required from the user, or at points within the lesson in which a pause is desired, such as to permit the use of ancillary equipment or supplemental display. In these teaching aids, reactivation of the audio reproduction device is achieved by a deliberate action of the user, such as turning a page of printed material and activating a button, supplying an acceptable response, or manipulating some control. Examples of teaching aids of this type are described in U.S. Pat. Nos. 3,540,132, issued to Glass et al.; 3,738,021, issued to Hino et al.; 3,996,671, issued to Foster; and 4,035,929, issued to Groff.

In the teaching aids described in the foregoing patents, the audio reproduction devices are reactivated by the user. There are no mechanisms which encourage and aid the user to follow along in the written material during periods of audio output. Thus, if it is desirable to use an audio-visual teaching aid to improve reading skills, it is important that the user of the device follows along in the written text at the same time that he is listening to the audio equivalent. Full benefits of the teaching aid for improving reading skills would not be realized if the user could just listen to the audio reproduction, such as a story. Greater benefits from the use of such teaching aids would be realized if the user could be encouraged to be attentive and follow along with the written text.

SUMMARY OF THE INVENTION

Accordingly, it is an object of the present invention to provide an improved educational aid for use with audio and visual equipment.

Another object of the present invention is to provide an improved educational aid for use with audio and visual equipment which will motivate and aid a student to practice reading.

Another object of the present invention is to provide an improved educational aid of the foregoing type which can be used to improve a student's reading skills and to learn the contents of written material.

Yet another object of the present invention is to provide an improved educational aid of the foregoing type having a user-controlled mechanism for coordinating the operation of an audio reproducing device with written material.

A further object of the present invention is to provide an improved educational aid of the foregoing type which has a relatively simple construction, is economical to produce, and can use standard written material, without modification.

Towards the fulfillment of these and other objects, a timer and control device is provided which can be readily coupled to an audio reproduction device. An audio reproduction or recording of a reading selection is made on a suitable medium, such as a recording tape, on which is also provided short, inaudible control signals corresponding to the end of predetermined portions of the reading selection, such as one or more lines or paragraphs. The user of the educational aid is provided with a control button coupled to the timer and control device which he is to depress upon reaching the end of a predefined portion of text in the reading selection. If upon reaching the end of a portion of text the user does not press the button within a time period determined by the control signal on the recording, the audio reproduction device is caused to stop until the user depresses a restart button and a specific time delay has lapsed. Repetitive omissions by the user to follow along in the written text will cause increasing delays in restarting the audio reproduction device, even if the restart button is subsequently pressed. The increasing delays provide negative reinforcements for not following the written text. The timer and control device is also provided with circuitry which will preclue the user from preventing stoppage of the audio reproduction device by continuously depressing the control button. Alternate embodiments and capabilities for the timer and control device are comprehended.

BRIEF DESCRIPTION OF THE DRAWINGS

The above description, as well as further objects, features and advantages of the present invention, will be more fully appreciated by reference to the following descriptions of a presently-preferred but nonetheless illustrative embodiment in accordance with the invention, when taken in connection with the accompanying drawings, wherein.

DESCRIPTION OF THE PREFERRED EMBODIMENT

Figure 1:
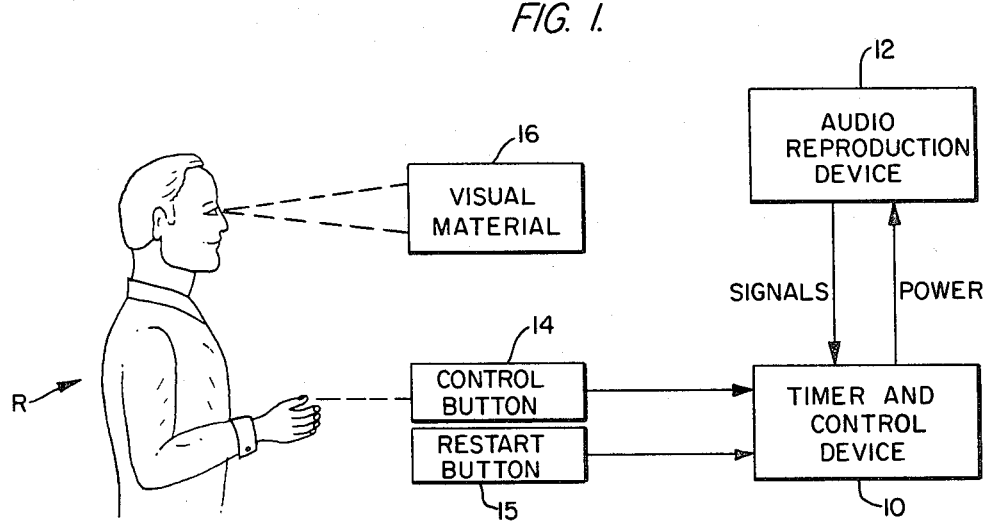
FIG. 1 is a diagram showing the basic components of an educational aid according to the present invention.

Referring now to FIG. 1 of the drawings, the principal components of an audio-visual educational aid in accordance with the present invention include a timer and control device 10, referred to hereafter as the "timer," which is coupled to and controls the on-off operation of an audio reproduction device 12, such as a conventional record or tape player. A control button 14, such as a conventional press button, is connected to the timer 10 and is designed to be manually operated by a reader R. A restart button 15, which may also be another conventional press button, is also connected to the timer 10. The audio reproduction device 12, referred to hereafter simply as a "player," operates to produce an audio reproduction corresponding to a visual material 16.

The connections between the timer 10 and the player 12 may be readily achieved by using the input/output jacks customarily provided on a record or tape player. Thus, a connection to the headphone jack or other auxiliary output jack of the player 12 can be used to transmit the signal output of the player to the timer 10. Similarly, the output of the timer 10 which controls the on-off operation of the player 12 can be transmitted to the player via the standard or auxiliary power input jack of the player.

An audio reproduction (not shown) of the visual material 16 is recorded on a sound recording medium, such as a phonographic record or magnetic tape, along with a plurality of inaudible signals of predetermined frequency and duration which mark the ends of selected portions of the visual material. Other signals of different frequencies and/or durations may also be recorded on the medium which, for example, may mark the end of a page of textual material. Additionally, background music or sound effects may be provided on the medium. These signals are recorded on the medium using known methods and equipment.

For the purpose of the following discussion, it will be assumed that the signals will be placed on the recording medium (hereinafter, the "recording") at points corresponding to the end of each line of textual material. Other points of demarcation can be used, such as at the end of paragraph, particularly if the paragraphs of textual material are short, at the end of selected lines of material, etc. It is contemplated that the textual material could be marked or otherwise highlighted at the locations where the control signals are recorded and where the user of the present educational aid is to depress the control button.

Figure 2:
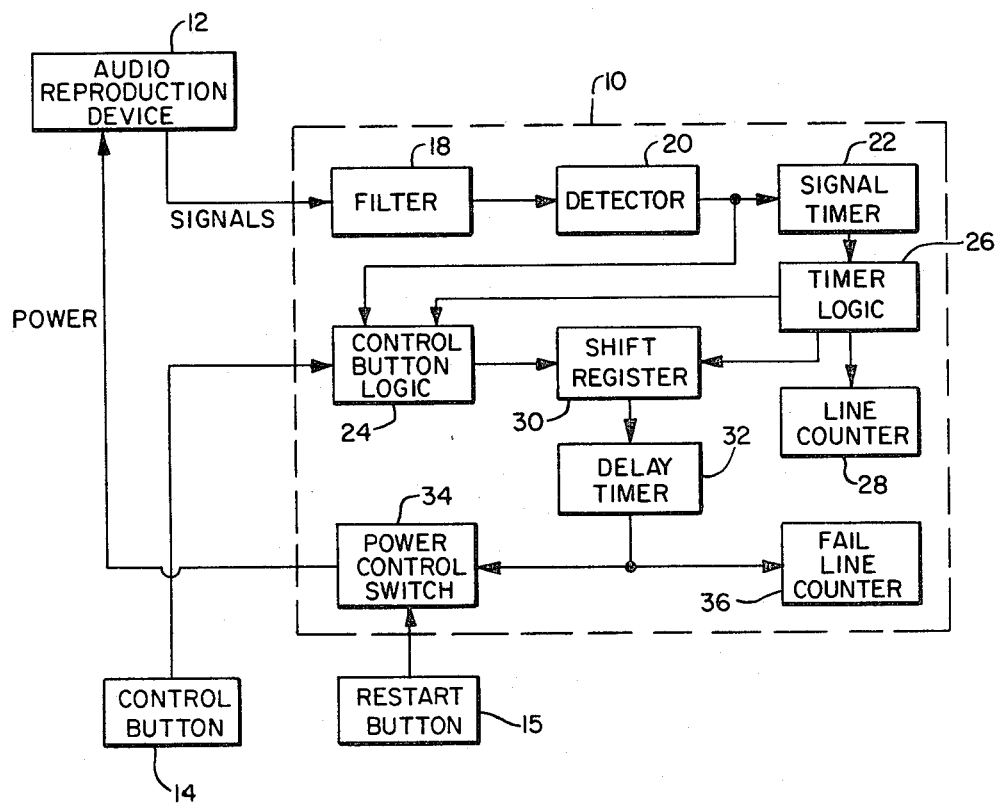
FIG. 2 is a diagram of one embodiment of the timer and control device according to the present invention.

FIG. 2 shows schematically the components of the timer 10 which responds to the control signals on the recording to control the on-off operation of the player 12 in accordance with this invention. The output of the player 12, which includes the audio reproduction of the visual material and the inaudible control signals marking the ends of lines in the visual material, such as a book, is fed into a filter 18 which isolates the signals. The presence of a control signal isolated by the filter 18 is sensed by a detector 20 which produces a corresponding output fed into a signal timer 22 and a control button logic 24. The signal timer 22 measures the duration of a control signal, which should last two seconds or longer. If a sensed signal lasts less than 0.8 seconds, it is assumed to be a transient. A timer logic 26 receives the signal duration information from the signal timer 22 and establishes the time period during which the control button 14 must be depressed to prevent the stopping of the player 12, as will be described later. A signal duration between, for example, 0.8 and 2.0 seconds will be interpreted by the timer logic 26 as a line increment signal to be directed to a line counter 28 without triggering the player stopping logic. The line counter 28 indicates the line of textual material being reproduced, and is reset by a switch 29. In some embodiments, switch 29 may be an "inside case" or key activated switch.

A signal duration from the signal timer 22 longer than 2.0 seconds will be interpreted by the timer logic 26 as a valid end-of-line signal. The control button logic 24 receives inputs from the control button 14, the detector 20, and the timer logic 26, and determines whether the control button has been depressed within a reasonable time window surrounding the exact end of a line of textual material. This time span or the "valid button push window" is defined by the output of the timer logic 26. If the control button 14 is depressed by the reader R upon reaching the end of each line, the control button logic 24 will interpret this as a signal within the "window" and the player 12 will not be stopped. If the button is not depresses within the window, a signal indicative of this condition is provided to the shift register 30, which triggers a delay timer 32 to activate a power control switch 34 to stop operation of the player 12.

The shift register 30 determines the number of successive lines for which the control button 14 was not properly depressed within the valid button push window and triggers the delay timer 32 to cause successively longer delays before the player 12 is restarted after each stoppage. The separate restart switch 15 permits restart of the stopped player, but will only restart the player 12 after the delay imposed by the delay timer 32. If the restart switch 15 is left in the "ON" position, the player 12 will restart automatically after the delay time has lapsed. The output of the delay timer 32 may also be used to increment a "fail" line counter 36 which registers the number of times the player 12 is stopped, or the number of lines of textual material for which the control button 14 was not properly depressed. The contents of the fail line counter 36 and the current line counter 28 may be selectively displayed on a known display means (not shown), such as a digital display, mounted on the timer 10.

Figure 3:
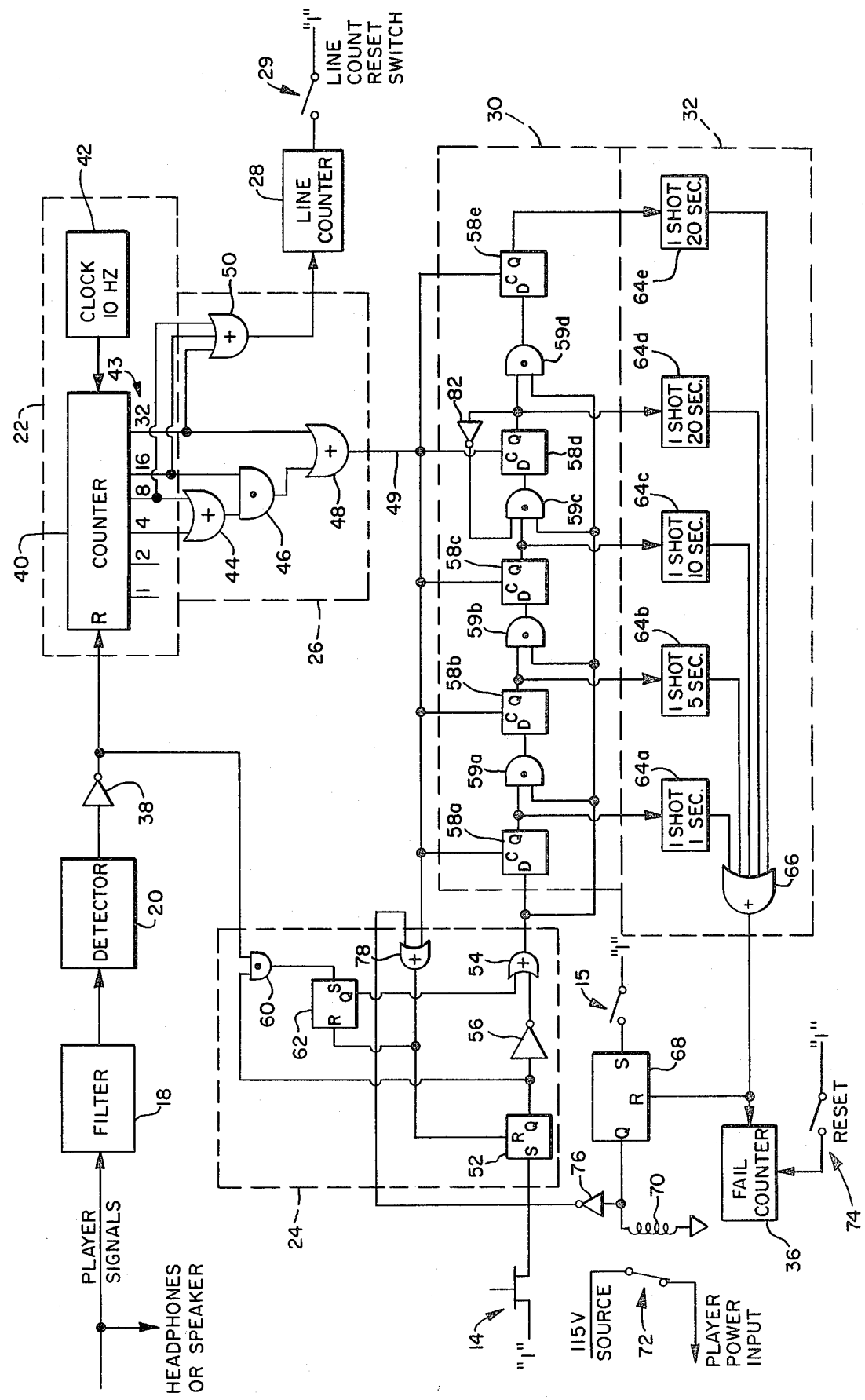
FIG. 3 is a schematic diagram of the timer and control device of FIG. 2.

A more detailed schematic of the timer 10 is shown in FIG. 3. The output signal from the player 12 is split between a pair of headphones or a speaker (both not shown) and the filter 18, which may be a phase locked filter, in the timer 10. If a stereo player is used, then separate lines would carry the control signals and the audio reproduction of the visual material 16, and the filter 18 and the headphones or speaker would be connected accordingly. The existence of a control signal isolated by the filter 18 is sensed by the detector 20 which produces a logical "ONE" output when a control signal is detected, and a "ZERO" output when there is no signal. The presence or absence of a signal is detected with time constants requiring several cycles of the signal appearing or disappearing to change the logical output of the detector 20. This requirement eliminates erroneous outputs by the detector 20 in response to short transients.

The output of the detector 20 is inverted by an invertor 38 and input into a counter 40 within the signal timer 22 which determines the duration of a control signal. If the signal lasts less than 0.8 seconds, it is assumed to be a transient, and the absence of a logical ONE output by the detector 20 resets the counter 40. All meaningful signals are assumed to exceed 0.8 seconds in duration. The primary purpose of the invertor 38 is to insure compatability of the output of the detector 20 with the counter 40. Hence, an output of ONE if a control signal is detected and ZERO if there is no control signal, is inverted to a ZERO or ONE, respectively, such that if there is no control signal, the ONE output of the invertor 38 suppresses operation of the counter 40, and the ZERO invertor output permits operation of the counter as a result of a detected control signal.

The counter 40 is timed by the output pulses of a clock 42 having a suitable frequency, such as 10 Hz, so that each output impulse is a specific time increment, which with 10 Hz would be 0.10 seconds. The counter 40, which is of known design, has a series of binary output taps 1, 2, 4, 8, 16 and 32.

The timer logic 26 utilizes the output of the signal timer 22 to determine the nature of the sensed control signal by its duration. The timer logic 26 includes a number of OR and AND gates connected to selected output taps of the counter 40. Thus, an OR gate 44 is connected to the output taps having a binary value of 4 and 8; AND gate 46 receives the output of the OR gate 44 and the tap with the binary value of 16; and OR gate 48 receives the output of the AND gate 46 and is connected to the binary tap 32. Another OR gate 50 is coupled to the 8, 16 and 32 binary output taps to detect a control signal of short duration, between 0.8 and 2.0 seconds, to increment the line counter 28 to keep the line count correct. The end-of-line signal is not used for this purpose since it may be desirable sometimes to increment the line counter 28 without requiring pushing the control button 14, such as in the case of very short lines or when paragraphs instead of lines are the designated points for pushing the control button.

The gates 44, 46 and 48 function to detect twenty output pulses of the clock 42, or a signal duration of 2.0 seconds since the occurrence of a logical ONE output by the detector 20. This 2.0 second signal determines the end of the time span during which the control button 14 must be depressed by the reader to insure that the player 12 continues without interruption. The end-of-line signals recorded on the recording must always be greater than 2.0 seconds duration in order to trigger the logic within the timer 10 which will stop the player 12. The exact duration of the signal is unimportant as long as it ends before the next control signal begins, although for the illustrated example it should not exceed 6.4 seconds. For a very short line of textual material, the signal from the previous line can be left on through the entire short line, such that a signal from the control button 14 will be ignored by the logic within the timer 10. A short 0.8 second signal can then be used to increment the line counter 28. As mentioned above, in addition to the line counter 28, the output signal of the timer logic 26 is provided to the control button logic 24 and the shift register 30.

Within the control button logic 24, a control button flip flop 52 receives the input from the control button 14 and the output of the OR gate 48 in the timer logic 26, which will be simply referred to as the logic signal 49. The resultant output of the control button flip flop 52 is applied to an OR gate 54 via an invertor 56 which functions similarly to the invertor 38 to insure compatability of the output from the flip flop 52 and the OR gate 54. The control button flip flop 52, which may be of known design such as a SR type, is set whenever the control button 14 is depressed, and is reset by the logic signal 49. If the flip flop 52 has not been set by the time the logic signal 49 is received, the OR gate 54 will provide a ONE output, or a "fail" signal, and this ONE will be shifted into the leftmost flip flop 58a in a series of such flip flops within the shift register 30.

The signal from the invertor 38 is fed into an AND gate 60 within the control button logic 24, and the output from the control button flip flop 52 is also branched into the AND gate 60. The output from the AND gate 60 is fed into a second flip flop 62, or the "fail" flip flop, which also receives the logic signal 49. Thusly connected, fail flip flop 62 will be set if the signal from the flip flop 52 indicates that the control button 14 has been pushed, but there is no end-of-line signal detected by the detector 20, as indicated by a logical ZERO output. In this situation, again the OR gate 54 will cause a ONE to be shifted into the leftmost flip flop 58a at the instant that the logic signal 49 goes to ONE. This means that the control button 14 must be released before the termination of the signal, and must not be depressed before the signal begins. The end-of-line signal must be at least 2.0 seconds duration, but longer durations are acceptable since the end of the time period, or the "window," is defined by the counter 40 and the output of the OR gate 48. The window is the time period within which the depression of the control button 14 will prevent stopping of the player 12.

The OR gate 54 is the OR function of the two fail conditions, and its output is fed into the shift register 30. At the instant of the leading edge of the output signal from the logic gate 48, defining the end of the window, the shift register 30 is shifted. If the output from the OR gate 54 is a ONE, then the contents of the individual flip flops 58 in the shift register 30 are shifted, shifting ONE into the leftmost flip flop 58a. If the signal from the OR gate 54 is a ZERO, then ZEROS are shifted into all the flip flops 58 in the shift register 30, regardless of their previous values.

The output of each of the flip flops 58 within the shift register 30 is applied to individual one shot elements 64a–64e within the delay timer 32, each element having a fixed time delay value, such as one second, five, ten, fifteen, etc. seconds. Depending upon the number of times that the logic within the timer 10 stops the player 12 as a result of a ONE being shifted into each of the flip flops 58a–58e within the shift register 30, the corresponding one shot element 64 generates a specific delay. Thus, if for example the player 12 is being stopped for the first time as a result of a ONE being shifted into the leftmost flip flop 58a, then the corresponding one shot 64a is triggered to generate a one-second delay. Similarly, if the player 12 is being stopped for two consecutive times as a result of ONE being shifted into the flip flops 58a and 58b, then the corresponding one shots 64a and 64b are triggered. Since the time delay generated by the one shot element 64b is five seconds, for example, which is longer than the delay generated by the one shot element 64a, the total delay generated by the delay timer 32 is, in this example, five seconds. Any delay generated by the one shot elements 64 triggers the OR gate 66 within the delay timer 32, and the output of this gate is applied to a run flip flop 68 within the power control switch 34. Resetting the run flip flop 68 energizes a coil 70 to open a switch 72, thus removing the power from and stopping the player 12. The run flip flop 68 cannot be set to the on position again until the end of the delay generated by the one shot elements 64 within the delay timer 32, and the restart button 15 is closed.

The output from the OR gate 66 is also applied to the fail line counter 36 which records, and displays if desired, the number of times the player 12 is stopped in the manner described above. The fail line counter 36 can be reset only by a teacher or monitor closing a reset switch 74 by means of a key or other "inside case" means.

In addition to energizing the coil 70, the output of the run flip flop 68 is inverted by an invertor 76 and applied to an OR gate 78. As can be seen in FIG. 3, the second input into the OR gate 78 is the logic signal 49, and the output of this OR gate is applied to the button flip flop 52 and the fail flip flop 62 to reset these flip flops when the player 12 has stopped. In this fashion, the flip flops are in condition to be set once the player resumes operation.

Referring back to the components within the shift register 30 and the delay timer 32, the output from each of the flip flops 58 within the shift register, in addition to being applied to the respective one shot element 64, is also applied to respective AND gates 59a–59d. The other input to each of the AND gates 59 is from the OR gate 54 within the control button logic 24. In this manner when the rising edge of the logic signal 49 activates the shift register 30, a ONE will be shifted into each flip flop 58b, 58c, 58d and 58e if the flip flop to the left has a ONE and the output of the OR gate 54 is also ONE. If the OR gate 54 output is a ZERO, indicating that the control button has been properly depressed, a ZERO is shifted into each flip flop 58a–58c.

Delays in the operation of the player 12 beyond a reasonable limit, such as twenty seconds, are unnecessary. Thus five stages, or five flip flops 58, are used in the shift register 30 in the illustrative embodiment, although more may be used. The last two stages are slightly unique since if all the flip flops 58 contain ONE after five successive failures, none of the one shots 64 will trigger since the triggering inputs remain constantly ONE, and a "rising edge" is necessary to trigger most one shot elements. An invertor 82 is connected after the flip flop 58d back to the AND gate 59c. In this manner, the invertor 82 insures that after the flip flop 58d is a ONE, the next successive failure to properly depress the control button 14 causes the flip flop 58e to become a ONE, but then the flip flop 58d will become a ZERO. The next successive failure will cause the flip flop 58d to become a ONE. However, since the flip flop 58d was previously a ZERO due to the invertor 82, the flip flop 58e will become a ZERO. As a result, after five successive failures, continued failures will cause the value in flip flops 58d and 58e to alternate, thus triggering either one shot 64d or 64e to produce a maximum delay of, for example, 20 seconds.

The educational aid is set up for operation by connecting the power plug on the timer 10 into any conventional power source, and coupling the timer to the player 12 by connecting the audio input line, for example, to the earphone output jack of the player and connecting the power input line of the player to the power output receptacle of the timer. The control button 14 and the restart button 15, which may be removable units, are properly connected to the timer 10. In operation, the reader R or other user places the recording corresponding to a selected visual learning material 16 on the player 12 and closes the restart button 15 to start operation of the player. The reader R than "reads along" with the audio reproduction by following each line of the textual material. At the end of each line or other designated portion of text, if the reader R depresses the control button 14 within the valid button press window, the player 12 continues operation and there is no interruption of the audio reproduction. If, upon reaching the end of a line of text, the reader does not press the control button 14 within the time window, the timer 10 operates in the manner described above to stop the player 12. The first time this happens, depressing the restart button 15 will restart the player 12 after a brief delay. However, if the player 12 stops on the next successive line because the reader R failed to press the control button 14 within the time window, the player will be stopped for at least 5 seconds, even if the restart button 15 is pressed during this time. After the player 12 restarts, if the reader R again does not depress the control button 14 within the time window, the player 12 again is stopped, but now the pause is for at least ten seconds. This pattern is repeated until the player 12 is stopped for twenty seconds at the end of each line of text if the reader R has not been following along and depressing the control button 14 within the time window. These increasing delays in the resumption of operation of the player 12, and hence the increasing interruptions in the audio reproduction, make it very difficult for the reader R to listen to the story and thus provide a negative reinforcement for not following along in the textual material. If the reader R does follow along in the text and presses the control button 14 within the valid button press window (approximately one second before or after the actual end-of-line point) on the recording as sensed by the timer 10, the player 12 will not stop, and the reader is able to enjoy listening to the story without unnecessary interruptions.

The educational aid forces the reader R to follow the written or visual learning material along with the audio reproduction from the player 12. If the reader R waits until the player 12 stops and then depresses the control button 14, the player will not start immediately. This feature prevents the reader avoiding following along in the text and listening to the audio reproduction by simply pushing the button every time the player 12 stops. Also, the reader R can not circumvent the necessity for following along in the text by continuously holding down the control button 14. In the manner described above, the timer 10 will stop the player 12 for increasing time delays at the end of any line when the button is pushed more than approximately one second before the actual end of the line. Thus, not only must the reader depress the control button 14 at the end of each line of text, but he must depress the button only within a specific time when the audio reproduction actually reaches the end of a line of text. It is understood, of course, that the time periods considered above, such as the duration of increasing periods of delay, or the width of the valid button push time window, can be adjusted to values which experiments show best fit various types of readers, or the exact sequence of delays can be modified if necessary.

It is understood that various modifications are contemplated within the scope of the invention disclosed above. For example, instead of having signals which mark the end of each line of text, the end of each sentence can be marked or other logical demarcations may be used, without affecting the design or operation of the timer device as described above.

In the embodiment of the invention described above, when the control button is depressed prior to an end-of-line signal a fail flip flop is set, making it inevitable that the tape will stop at the next decision point (rising edge of the logic signal 49). Another equally acceptable approach would be to modify the device so that depressing the control button 14 prior to an end-of-line signal would stop the tape immediately, by forcing a ONE onto the output of the OR gate 54, and then shifting the flip flops 58, independently of the signal 49. Minor modifications of the schematic of FIG. 3 would effect this change.

A simple modification to FIG. 3 may prove useful. If the control button 14 is connected to the control button logic 24 through a differentiating capacitor, a diode, and a resistor in the conventional manner, then the control button logic will respond only to the rising edge of the control button's output. No other changes would be necessary. In this way, exactly how long the control button 14 is depressed will be apparent to the system, provided only that the button is released some time prior to when it must again be depressed.

Another modification to the timer device is the inclusion of one or more additional counters which count and display the total number of lines read by the reader by simply counting the end-of-line marks. A separate counter may be used to determine and display the current line of a text which the audio reproduction is providing. Another counter may be provided for determining and displaying the page number of the text. Determination of the page number can be achieved by a number of methods. For instance, the page number counter may be incremented by an end-of-page button activated by the reader or by a unique end-of-page control signal on the audio reproduction. In this fashion the line number counter would be reset to zero by incrementation of the page number counter by any of these methods. Further, the specific line of text and/or page number could be encoded by known techniques on the audio reproduction to define the exact line and/or page of the text. However, these modifications increase the complexity of the educational aid. Since data displays are easily switched from displaying one value to another, only one display would be required regardless of the number of counters provided in the timer device.

Several special situations may occur which the disclosed timer device can handle. If a line of text is very short, as for example the last word of a paragraph may be a single word on a separate line, it would not be feasible to have two, separate end-of-line signals, nor to require the reader to depress the control button after only a single word on a line. However, by simply making the end-of-line signal extend over the short, single-word line, then as far as the stopping logic in the timer device is concerned it will only have been one signal marking an end of line, and the reader need only depress the control button once. A problem, however, may arise if a line counter is provided in the timer device since it would then count only one line instead of two, separate lines, because only one end-of-line signal is detected. This situation is avoided by a separate (short) end-of-line signal which is counted by the line counter, but is ignored by the stopping logic. Other solutions, of course, are possible.

In connection with the short line situation, a problem may arise when the reader fails to properly depress the control button 14 at the end of a line and the next line is very short. As described above, when a very short line occurs in the textual material, the reader is not required to depress the control button since the end-of-line signal from the previous line is extended. However, when the player is restarted, the remainder of the extended signal may exceed 0.8 seconds and thus improperly increment the line counter 28. This problem may be avoided by modifying the schematic of FIG. 3 to include a 2-second one shot device between the invertor 38 and the counter 40. The output of the one shot device is connected to the reset input of the counter 40 through an OR gate which also receives the output of the invertor 38. The one shot device is triggered ON by the falling edge of the flip flop 68 signal which indicates that the player 12 is being restarted. In this manner the one shot device delays operation of the counter 40 immediately after player restart and effectively causes the signal timer 22 to be deaf to the end-of-line signal for 2 seconds after restart of the player.

Instead of a separate restart button, the control button 14 may be used to restart the player as well as to indicate an end-of-line. In this embodiment some additional logic is required to prevent the timer device interpreting this as an error. This may be achieved by using a special flip flop to indicate when the player is stopped so that the depression of the control button will be interpreted as a restart signal. Alternatively, a separate restart button may be eliminated altogether and the player automatically restarted at the end of the punitive delay.

Although not particularly illustrated in the drawings, it is understood that all of the components described above are arranged and supported in an operative fashion to form a complete and operative system. Further, it is understood that all ancillary components, such as power and connecting lines, couplings, switches, etc., have not been specifically described, but such components are known in the art and would be appropriately incorporated into the operative system. Of course, additional variations of the specific construction and arrangement of the educational aid and timer device disclosed above can be made by those skilled in the art without departing from the invention as defined in the appended claims.

What is claimed is:

1. An audio-visual educational system comprising:
    an audio reproduction device operable with an audio reproducing medium having an audio equivalent of a textual material and signals at points corresponding to selected demarcation points in the material; and
    control means coupled to the audio reproduction device and operative in response to the signals to stop operation of the device, the control means including selectively operable control means which prevents the control means stopping operation of the device when the selectively operable control means is actuated within a predetermined time span of the signals, and means to restart operation of the stopped reproduction device.

2. The system of claim 1, wherein the control means further includes delay timing means to vary the length of time the reproduction device is stopped in response to successive signals.

3. The system of claim 1, wherein the control means further includes:
    timing means to vary the length of time the reproduction device is stopped in response to successive signals; and
    restart means to resume operation of the device after lapse of the stop time.

4. The system of claim 1, wherein the selectively operable control means is operated by the system user in response to the selected demarcation points in the textual material.

5. An audio-visual educational system which coordinates reading of textual material with an audio presentation of the material, comprising:
- an audio reproduction medium containing an audio equivalent of a textual material and signals at selected points on the audio equivalent corresponding to points of demarcation in the textual material;
- an audio reproduction device for reproducing the audio equivalent and signals on the medium;
- control means operatively coupled to the audio reproduction device and responsive to the signals to stop operation of the device;
- selectively operable control means coupled to said control means and operative to prevent stopping of the audio reproduction device by said control means,
- said control means responsive to the selectively operable control means to continue operation of the reproduction device when the selectively operable control means is actuated within a predetermined time period of the stop signals, and said control means stopping operation of the reproduction device when the selectively operable control means is not operative within the predetermined time period; and
- means to restart operation of the stopped reproduction device.

6. The system of claim 5, wherein the selectively operable control means is operated by a system user in response to the points of demarcation in the textual material.

7. The system of claim 5, wherein said control means includes timing means to stop the reproduction device for varying lengths of time in response to successive signals.

8. A timing and control apparatus operable to control operation of an audio reproduction device, the reproduction device operable with an audio reproduction medium containing the audio equivalent of a textual material and signals at selected points corresponding to selected demarcation points in the material, said apparatus comprising:
- signal detection means to detect the presence of the signals on the reproduction medium;
- operation means to control the operation of the audio reproduction device;
- means responsive to the signal detection means to cause the operation means to stop operation of the reproduction device;
- control means selectively operable to prevent said responsive means stopping operation of the reproduction device; and
- restart means coupled to the operation means to restart operation of the stopped audio reproduction means.

9. The apparatus of claim 8, wherein the control means is selectively operated by the apparatus user in response to the selected demarcation points in the textual material.

10. The apparatus of claim 8, further comprising:
- first timing means responsive to the signal detection means to establish a time period in which operation of the control means is effective; and
- logic means to determine if the control means is operated within the time period established by the first timing means.

11. The apparatus of claim 10, further comprising a second timing means coupled to said responsive means to establish varying lengths of time during which the audio reproduction device is stopped in response to successive signals.

* * * * *